United States Patent [19]

Hamasaki

[11] Patent Number: 5,223,980
[45] Date of Patent: Jun. 29, 1993

[54] LENS BARREL OPERATING MECHANISM

[75] Inventor: Takuji Hamasaki, Saitama, Japan

[73] Assignee: Asahi Kogaku Kogyo Kabushiki Kaisha, Tokyo, Japan

[21] Appl. No.: 885,899

[22] Filed: May 20, 1992

[30] Foreign Application Priority Data

May 21, 1991 [JP] Japan .................. 3-218141

[51] Int. Cl.⁵ ............................................. G02B 15/14
[52] U.S. Cl. ..................................... 359/694; 359/705; 354/195.1
[58] Field of Search ............... 359/694, 696, 699, 700, 359/702, 705, 706, 823; 354/400, 195.1, 195.11

[56] References Cited

U.S. PATENT DOCUMENTS

| | | | |
|---|---|---|---|
| 4,071,850 | 1/1978 | Okura | 354/195.11 |
| 4,334,737 | 6/1982 | Nozawa et al. | 359/700 |
| 4,346,967 | 8/1982 | Komoto et al. | 359/705 |
| 4,448,496 | 5/1984 | Isobe et al. | 359/705 |
| 4,506,959 | 3/1985 | Hama | 359/705 |
| 4,720,182 | 1/1988 | Imanari | 359/705 |
| 4,806,000 | 2/1989 | Shiokama et al. | 359/706 |
| 4,890,132 | 12/1989 | Hama | 359/823 |
| 4,893,145 | 1/1990 | Matsuda | 354/400 |
| 5,041,855 | 8/1991 | Takezawa et al. | 354/195.1 |

Primary Examiner—Loha Ben
Attorney, Agent, or Firm—Sandler Greenblum & Bernstein

[57] ABSTRACT

A lens barrel operating mechanism for use in a lens barrel provided with a stationary ring is provided. An operating ring arranged on the outer circumference of the stationary ring is provided to be capable of moving in the optical axis direction of the stationary ring and rotating about the optical axis. The operating ring is provided with annular grooves formed on the inner circumferential surface thereof, with a sliding member having rollers set in the annular grooves in such a manner as to permit the rollers to move freely in the extending direction of the annular grooves and capable of moving in interlocking relation with the movement of the operating ring in the optical axis direction, and with a clicking mechanism arranged between the sliding member and the side of the stationary ring and giving the operator a clicking sensation for each of the terminal positions in the range of movement of the operating ring in the optical axis direction.

10 Claims, 7 Drawing Sheets

LENS BARREL OPERATING MECHANISM

BACKGROUND OF THE INVENTION

The present invention relates to a lens barrel operating mechanism which is capable of switching the mode set on a lens barrel, for example, by operating an operating member moving in the optical axial direction.

Applicant invented an electrically operated zoom lens provided with a lens barrel provided with a zooming operation ring which can be operated for moving the lens in the optical axial direction and filed Japanese Patent applications No. HEI 2-28902 and No. HEI 2-28903 on the invented electrically operated zoom lens on Feb. 8, 1990. Then, claiming the rights to the priority of the invention for patents, Applicant also filed a U.S. patent application as U.S. Ser. No. 651,555 in the United States on Feb. 6, 1991, now U.S. Pat. No. 5,148,199, a German patent application No. P4 103 187.1 in Germany on Feb. 8, 1991, a U.K. patent application No. 9102621.1 in the United Kingdom of Great Britain on Feb. 7, 1991, and then a French patent application No. 90 01458 in France on Feb. 8, 1991.

The electrically operated zoom lens disclosed in these patent applications is constructed in such a manner that it is capable of changing its operating modes between an electrical zooming mode, in which the focal length of the lens is changed by a built-in driving motor, and a manual zooming mode, in which the focal length is changed by the photographer's manual operation. Changing the zooming operation between these modes is performed by moving the zooming operation ring in the optical axial direction. The zooming operation ring is provided with clicking mechanisms respectively for the positions in the electrical zooming operation and the positions in the manual zooming operation, in order to enable the photographer to gain a clear and definite recognition of each of the electrically operated zooming positions defining the electrical zooming mode and each of the manually operated zooming positions defining the manual zooming mode and in order also to keep the zooming operation ring set in engagement in the current position to which the zooming operation ring has been brought.

In this regard, each clicking mechanism is provided with a pair of annular V-shaped grooves respectively formed in positions on the inner circumferential surface of the zooming operation ring in correspondence with the positions for the electrical zooming operation and with the positions for the manual zooming operation. Also, click balls, which are selectively isertable into these V-shaped grooves, and plate springs, which exert pressing force onto these click balls towards the inner circumferential surface of the zooming operation ring, are supported on the outer circumferential surface of a stationary ring. The stationary ring supports the zooming operation ring in a manner enabling it to rotate.

In the existing clicking mechanism, however, the click balls are pushed by the plate spring for their outward motion in the radial direction of the zooming operation ring. Consequently, the click balls are always held by elastic contact directly with the surface of the inner circumference of the zooming operation ring. As the result, the elastic contact of the click balls presents the problem in that their elastic contact places a load on the zooming operation ring in its linear movement and causes an undesirable sensation in its operation.

SUMMARY OF THE INVENTION

The present invention has been made in view of the above-mentioned problem, and a primary object of the invention is therefore to provide a lens barrel operating mechanism which works effectively in such a manner as to operate without being liable to any force applied to it in its radial direction and also to give a more favorable sensation of clicks when the lens barrel operating mechanism is operated in a lens barrel provided with a zooming operation ring for moving the lens in the direction of its optical axis.

Moreover, another object of the present invention is to provide a lens barrel operating mechanism having a clicking mechanism which is not provided with a click ball.

Furthermore, still another object of the present invention is to offer a lens barrel operating mechanism which is provided with a clicking mechanism correlated in its operation with other mechanisms and which can attain reductions of the size, weight, and cost, of such a lens barrel operating mechanism through a reduction of the number of the component parts needed in the overall construction of such a mechanism.

In order to resolve the problem mentioned above and to attain the objects of the present invention, the lens barrel operating mechanism according to one aspect of the present invention is provided with an operating ring arranged on the outer circumference of the stationary ring, in such a manner that the operating ring is capable of moving linearly in an optical axial direction of the stationary ring and rotating round the optical axis. The operating ring is provided with an annular groove formed on its inner circumferential surface, and a sliding member having rollers fitted into the annular groove so as to be relatively movable in the extending direction of the annular groove. The sliding member is set to be moved in an interlocking manner with the movement of the operating ring in the optical axial direction in the same direction as the direction in which operating ring moves. A clicking device is arranged between the sliding member and the stationary ring for giving an operator a clicking feeling at both terminal positions of the movement range in the optical axial direction of the operating ring.

The lens barrel operating mechanism according to the present invention, constructed in the manner described above, provides a zooming operation ring that is free from any force exerted on it to thrust it outward in the radial direction and can produce a more desirable direct operating sensation.

The present invention can also be applied, for example, to an automatic focusing (AF) and manual focusing (MF) changeover ring, which will change the focusing mode between automatic focusing and manual focusing, in addition to its application to a zooming operation ring which performs changeover operations between electrical zooming and manual zooming.

In the case of a zooming operation ring, a clicking mechanism can be constructed in a structure integrated with an electrical switching device for changeover operations between electrical zooming and manual zooming or in a structure integrated with the clutch operating device for the electrically operated zooming motor.

BRIEF DESCRIPTION OF THE DRAWINGS

The manner by which the above-mentioned objects, features and advantages of the present invention are attained will be fully evident from the following detailed description when it is considered in light of the accompanying drawings, wherein.

DETAILED DESCRIPTION OF PREFERRED EMBODIMENTS

Now, with reference to FIG. 1 through FIG. 7 in the accompanying drawings, a detailed description will be made of the construction of a lens barrel to which the lens barrel operating mechanism in a preferred embodiment of the present invention is applied.

Figure 1:
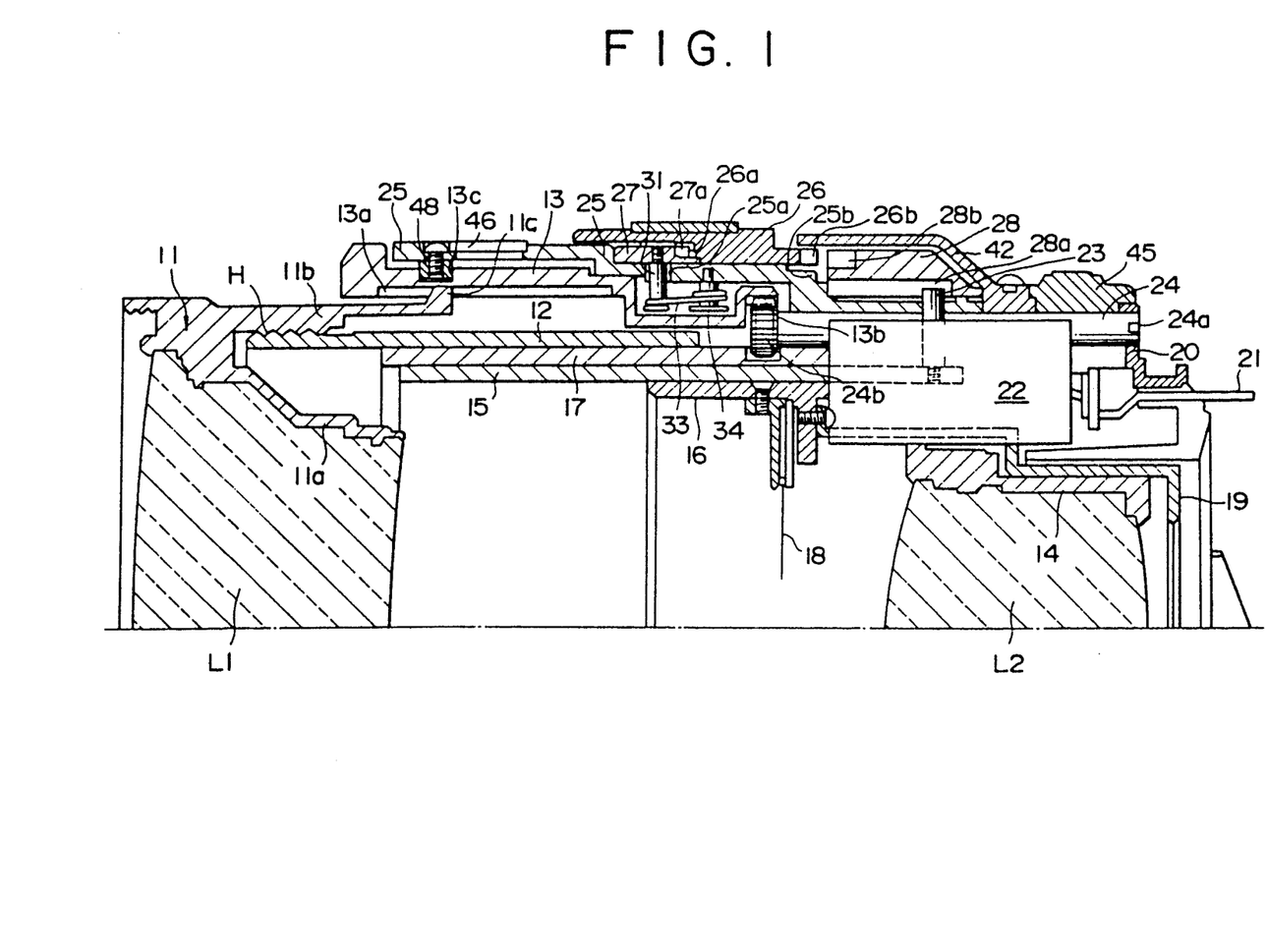
FIG. 1 is a sectional view illustrating at the wide angle side the construction of the electrically operated zoom lens to which the present invention is applied.
Figure 2:
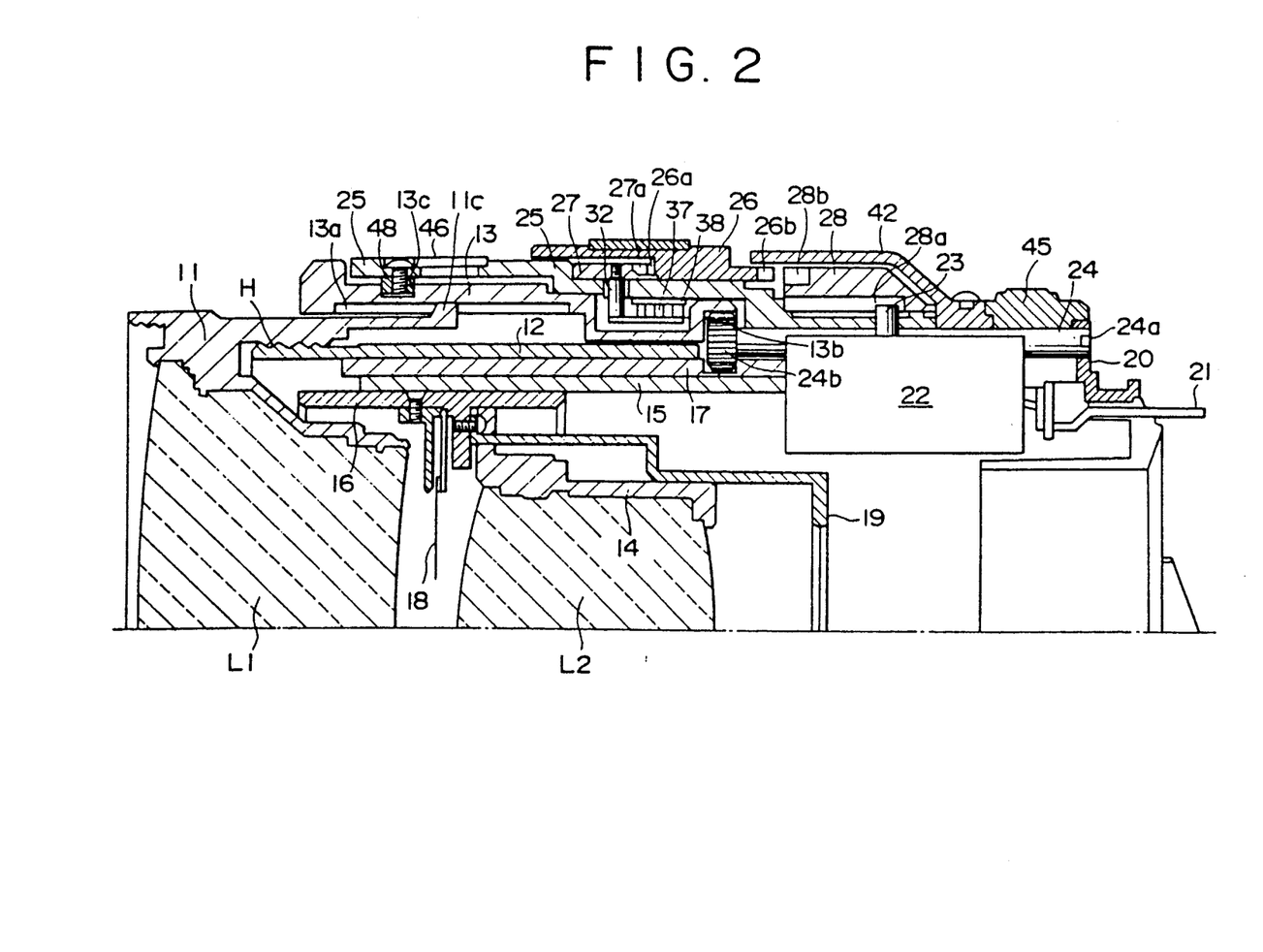
FIG. 2 is a sectional view illustrating at the telescopic side the construction of the electrically operated zoom lens to which the present invention is applied.

In the applied example, the lens barrel is applied to an electrically operated zoom lens, which is a zoom lens provided with two groups of lenses with a built-in motor, as illustrated in FIG. 1 and FIG. 2. In detail, the electrically operated zoom lens is provided with a front group lens frame 11 with the front group lens L1 fixed therein in such a manner that the front group lens frame can move freely in the optical axial direction of the zoom lens.

The front group lens frame 11 is coaxially positioned on the inner circumference at a distal end part of the helicoid ring 12, and it is provided with a coaxially held structure integrating a lens holding part 11a, which holds the front group lens L1 on its inner circumference, and a cylindrical sleeve 11b, which is fitted on the outer circumference at the distal end part of the helicoid ring 12. The inner circumference of the sleeve part 11b and the outer circumference of the helicoid ring 12 are joined together with helicoid threads H.

A linear movement guiding projection 11c is formed, for radially outward projection on the rear end, which extends along the optical axis, of the sleeve part 11b of the front group lens frame 11. In this regard, a focusing ring 13 is coaxially fitted on the outer circumference of the sleeve part 11b. A linear movement guiding groove 13a, which extends in the optical axial direction, is formed on the inner circumferential surface of the focusing ring 13. The linear movement guiding projection 11c is fitted into the linear movement guiding groove 13a.

On the other hand, the rear group lens L2 is arranged in a rearward position along the optical axis of the front group lens frame 11 and is fixed coaxially on the inner circumference of a rear group lens frame 14 which moves freely in the optical axial direction. On the outer circumference of the rear group lens frame 14, a cam ring 15 is coaxially arranged. Moreover, the pins (not shown in the drawings) which are set in the rear group lens frame 14 are engaged with a cam groove (not shown in the drawings) which are formed on the inner circumferential surface of the cam ring 15.

Further, a diaphragm moving ring 16 is fitted coaxially on the outer circumference of the rear group lens frame 14. Also, pins (not shown in the drawings) which are set on the outer circumferential surface of the diaphragm moving ring 16 are fitted in the same manner in the cam groove (not shown in the drawings) which is formed on the inner circumferential surface of the cam ring 15. Moreover, the cam ring 15 is similarly supported, in its state of sliding on the inner circumferential surface of the internal stationary ring 17, in a manner permitting its free rotation around the optical axis.

The rear group lens frame 14 and the diaphragm moving ring 16, which are thus arranged coaxially on the inner circumference of the cam ring 15, are supported, in a state in which they are only permitted to move linearly in the optical axial direction, with the linear movement guiding mechanism (not illustrated in the drawings), which is provided between the rear group lens frame 14 and the diaphragm moving ring 16 on one hand and the internal stationary ring 17 on the other. Therefore, the rear group lens frame 14 and the diaphragm moving ring 16 will move linearly in the optical axial direction, in such a predetermined relation as is determined by the cam groove formed in the cam ring 15, when the cam ring 15 rotates.

The diaphragm moving ring 16 is provided with a plurality of diaphragm blades 18 positioned between the front group lens L1 and the rear group lens L2, and a light shield ring 19, for shielding the rear end of the rear group lens L2 from light to a prescribed extent, is formed at the rear end of the diaphragm moving ring 16.

Moreover, the diaphragm blades 18 are connected with a diaphragm lever 21, which projects towards an area behind a mount ring 20 connected in an integrated structure with the rear end of the internal stationary ring 17, and they are driven for opening and closing operations in accordance with the movement of the diaphragm lever 21. In this regard, the mount ring 20 is formed in such a way that it delimits the rear area of the zoom lens and can be mounted, in a manner permitting its free attachment and detachment, on the mount face of a camera body not illustrated in the drawings.

Further, cam grooves (not shown in the drawings) are formed on the inner circumferential surface of the helicoid ring 12. The pins (not shown in the drawings) which are set on the outer circumferential surface of the cam ring 15 are fitted into these cam grooves. Accordingly, when the cam ring 15 rotates round the optical axis, the front group lens frame 11, which moves straight by the linear movement guiding groove 13a, will be moved in the optical axial direction. That is to say, the rotation of the cam ring 15 causes the front group lens L1 and the rear group lens L2 to move in the optical axial direction while they change the air interval between them in accordance with a predetermined relation based on the profile of the cam groove, and a zooming operation is performed by thus varying the focal length as regulated by an optical system formed by the combination of the front group lens L1 and the rear group lens L2.

The cam ring 15 is constructed in such a manner that is driven for its rotation by a driving motor for zooming, which is fixed, together with the internal stationary ring 17, in the inside of the zoom lens. The cam ring 15 is constructed in such a way that it can be driven for rotation by a manual operation with a manual operation lever 23, which projects radially inwardly inside the zoom lens.

The focusing ring 13 is constructed such that it is driven for rotation by means of an automatic focusing (AF) driven shaft 24, which is axially supported in a manner permitting its free rotation round its rotating control axis in parallel with the optical axial direction. Specifically, the AF driven shaft 24 has a joint part 24a formed on its rear end, and the joint part 24a, being flush with the rear area of the mount ring 20, is positioned in alignment with the rear area of the mount ring 20, and, when the mount ring 20 is mounted on the camera body, the joint part 24a is connected with an AF driving shaft located at the camera body side, and the AF driven shaft 24 is thus driven for rotation with the rotating force which it receives in this manner from the AF driving shaft. A gear 24b is fixed coaxially at the front end of the AF driven shaft 24. The gear 24b meshes with an internal gear 13b formed on the inner circumferential surface of the focusing ring 13.

Accordingly, when the AF driven shaft 24 is driven to rotate about its own central axis, the focusing ring 13 rotates round the optical axis in accordance with this rotation, and the front group lens frame 11 will rotate around the optical axis together with the focusing ring 13 by the effect of the engaging relation between the linear movement guiding groove 13a and the linear movement guiding projection 11c. As the front group lens frame 11 rotates in this manner, the front group lens moves, guided by the helicoid groove H, in the optical axial direction and performs a focusing operation, forming an image in the position of the focal point.

An external stationary ring 25 is arranged coaxially, and is fixed onto the mount ring 20, on the outer circumference of the focusing ring 13. A zooming operation ring 26, which is operated by the photographer's hand in such a manner that it can move in the optical axial direction, effects a switching operation between the electric zooming mode, in which the built-in driving motor for zooming is put into action for changing the focal length, and the manual zooming mode, in which the focal length is changed by the photographer's manual operation. A switch ring 27, which is used for starting the driving motor for zooming 22 when the electrical zooming mode has been set, and a manual zooming ring 28, which is to be operated for manually rotating the cam ring 15 sectioned above when the manual zooming mode has been set, are fitted coaxially in the outer circumference of the external stationary ring 25 in such a manner that the rings 26, 27, and 28 can be respectively rotated about the optical axis.

In this regard, a return column 31 (shown in FIG. 1) and a brush pin 32 (shown in FIG. 2), both of which project inward in the radial direction by way of through holes (not illustrated in the drawings) in the external stationary ring 25, are fixed on the inner circumferential surface of the switch ring 27.

Next, with reference to FIG. 6 and FIG. 7, a description will be made of a return mechanism NR, which returns the switch ring 27 to its neutral position (namely, the position in which the switch ring 27 does not function for starting the zooming operation in the electrical zooming mode). The return mechanism NR, which is fixed on the inner circumferential surface of the switch ring 27, is provided with a return column 31 (shown in FIG. 1) and a brush pin 32 (shown in FIG. 2), both of which project radially inwardly by way of through holes 25a made in the external stationary ring 25. The return column 31 is set in such a way that it receive symmetrical rotating force centering around the neutral position from a pair of neutral position return springs 33 supported on the side of the external stationary ring 25. That is to say, the return column 31 (namely, the switch ring 27) is held elastically in the neutral position N by the effect of the force applied by the pair of neutral position return springs 33 when the switch ring 27 is in a state in which it is not subjected to any external force (namely, the force applied to the switch ring 27 for its rotation around the optical axis by a rotating operation by the photographer).

To describe the above-mentioned construction in further detail, a pair of neutral position return springs 33, positioned in mutually symmetrical positions with respect to the return column 31, are each made up of a central coil part 33a and leg parts 33b and 33c extending from the central coil part 33a towards both sides. Each of the central coil parts 33a is set in a pin 34 installed for projection inwardly on the inner circumferential surface of the external stationary ring 25.

On the other hand, the leg parts 33b and 33c of each of the return springs 33 are respectively suspended on a pin 35 installed projection inward in the direction of the radius from the inner circumferential surface of the external stationary ring 25 and on a return column 31 mounted on the switch ring 27. Here, the leg part 33b which is suspended on the return column 31 is also suspended on the neutral column 36 installed for projection inward in the direction of the radius on the inner circumferential surface of the external stationary ring 25 so that the leg part 33b faces the return column 31.

Figure 5:
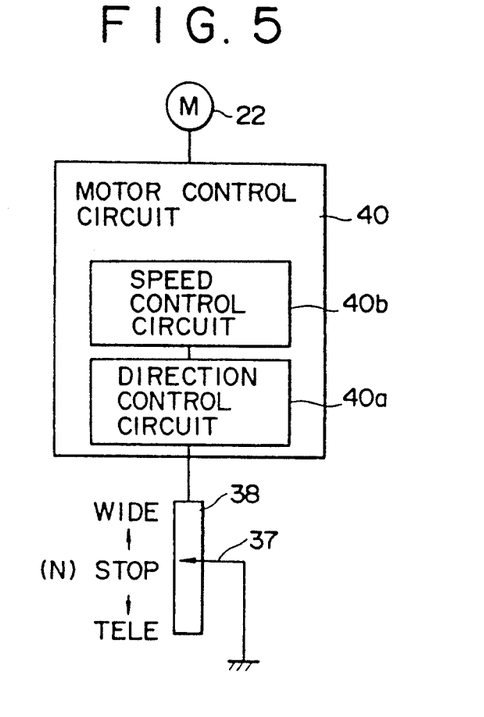
FIG. 5 is a control block diagram illustrating the construction of a control system for a motor arranged in the lens barrel.

In the meanwhile, the brush pin 32 has a brush 37 fixed as a contactor at the end part thereof in the direction of the radius. The brush 37 is in its contact with a code plate 38 fixed on the inner circumferential surface of the external stationary ring 25. The brush 37 and the code plate 38 are installed in order to detect the direction of rotation of the switch ring 27 from the neutral position N and to detect the angle (i.e., amount) of its rotation, and the code plate 38 is connected, as shown in FIG. 5, with a motor control circuit 40 for controlling the driving operation of the zoom driving motor 22 and constructed in such a way as to put out the detected information (namely, information on the direction of rotation and information on the angle of rotation) to the motor control circuit 40.

The motor control circuit 40 is constructed in such a way that it controls the direction of rotation and rotating speed of the zoom driving motor 22 with the detected information thus received and performing control via a rotating direction control circuit 40a and a speed control circuit 40b in regular sequence. In specific terms, the motor control circuit 40 is set in such a way that the larger the detected angle of rotation, the faster the rotating speed of the zoom driving motor 22 will be.

Moreover, the manual zooming ring 28 has its movement in the optical axial direction restricted by means of a staged (or stepped) part 25b, which is formed in the middle part of the external stationary ring 25, and a cover ring 42, which is fixed coaxially on the outer circumference of the rear part of the external stationary ring 25. A straight line groove 28a extending in the optical axial direction is formed on the inner circumferential surface of the manual zooming ring 28. The end part of the manual operation lever 23, in the radial direction, is fitted into the straight line groove 28a. In this regard, the straight line groove 28a is a groove formed for the assembly of the zoom lens, and it is therefore not provided in order to allow the manual operation lever 23 and the manual zooming ring 28 to perform relative movement in the optical axial direction.

Figure 4:
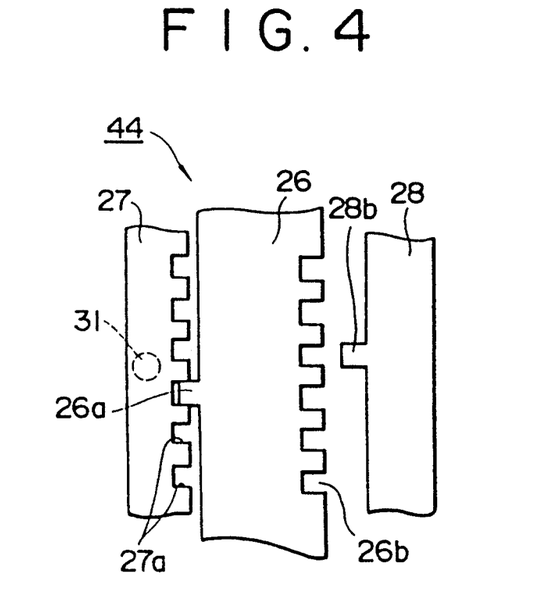
FIG. 4 is a development illustrating a switch ring, a zoom operation ring, and a manual operation ring.

Then, an alternative engagement mechanism (mechanical clutch mechanism) 44 is interposed between the zooming operation ring 26 and the switch ring 27 the between the zooming operation ring 26 and the manual zooming ring 28, as shown in FIG. 4. The alternative engagement mechanism which is thus interposed between the zooming operation ring 26 and the switch ring 27 is provided with a projection 26a, which is formed at the end surface of the zooming operation ring 26 at the side of the switch ring 27, and engaging grooves 27a, a plurality of which are formed at equal intervals along the circumferential direction on the end surface of the switch ring 27 at the side of the zooming operation ring 26 and permit the projection 26a to move in the optical axial direction to enter into one of the engaging grooves and to form a mutual engagement with the engaging groove 27a in respect to the rotating direction.

Further, the alternative engagement mechanism 44 which is interposed between the zooming operation ring 26 and the manual zooming ring 28 is comprised of engaging grooves 26b, a plurality of which are formed at equal intervals in the circumferential direction on the end surface of the zooming operating ring 26 at the side of the manual zooming ring 28, and a projection 28b, which is formed at the end surface of the manual zooming ring 28 at the side of the zooming operation ring 26 and can enter into one of these engaging grooves 26b and to perform mutual engagement with the engaging groove 26b with respect to the rotating direction. Both of the set of the projection 26a and the engaging groove 27a and the set of the projection 28b and the engaging groove 26b will not be put into engagement at the same time.

When the zooming operation ring 26 is moved forward towards the PZ (power zoom) position in the direction of the optical axis, the projection 26a and the engaging groove 27a will be set into their mutual engagement position while the projection 28b and the engaging groove 26b are put into a state in which they are moved away from each other. On the other hand, the movement of the zooming operation ring 26 towards the MZ (manual zoom) position in the optical axial direction will bring the equal-interval engaging groove 26b and the projection 28b into their mutual engagement position while the projection 26b and the engaging groove 27a are put into the state in which they will move away from each other.

Figure 3:
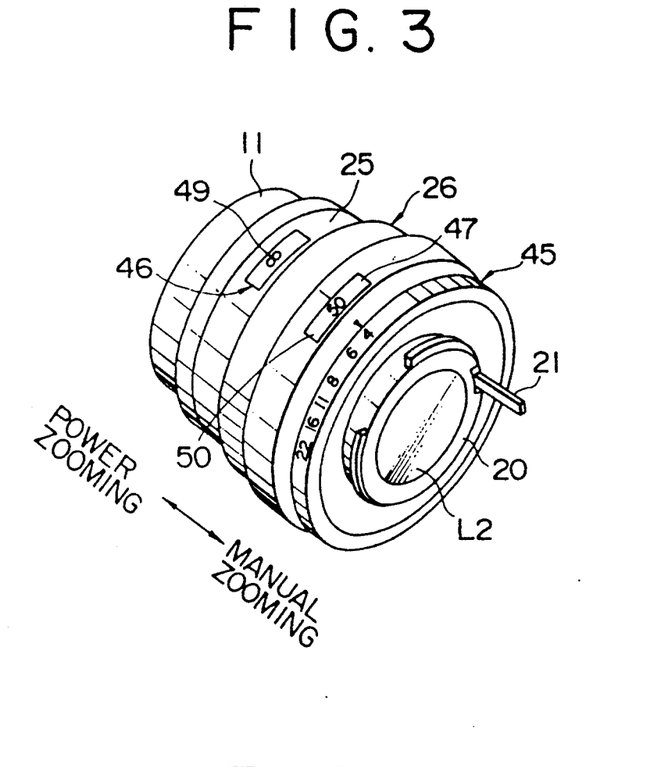
FIG. 3 is a perspective view illustrating the visible external view of the construction of an electrically operated zoom lens.

Moreover, as shown in FIG. 3, a calibrated diaphragm ring 45 with a diaphragm scale indicated on its outer circumferential surface is mounted on the rear area of the cover ring 42, in such a manner as to permit the calibrated diaphragm ring to rotate freely about the optical axis. Also, a photographing distance scale window 46 through which a photographing distance scale 49 can be read is formed on the outer circumferential surface of the external stationary ring 25. On the other hand, a focal length window 47 through which a calibrated focal length scale 50 can be read is formed on the outer circumferential surface of the cover ring 42. The focal length scale 50 is indicated on the outer circumferential surface of the manual zooming ring 28.

Now, a projection 48 for regulating the rotating range of the focusing ring 13 is fixed on the inner circumferential surface of the external stationary ring 25 as shown in FIG. 1. The projection 48 for regulating the rotating range is designed in such a way as to be fitted into a circumferential direction groove 13c, which is formed at a certain angle in the circumferential direction on the outer circumferential surface of the focusing ring 13 to regulate the rotating range of the focusing ring 13.

The lens barrel for the electrically operated zoom lens attains the power zoom (PZ) mode by a forward movement of the zooming operation ring 26. In the PZ mode, the zooming operation ring 26 and the switch ring 27 are combined into one structure with respect to the direction of their rotation, so that the switch ring 27 is driven for rotation in interlocking relation with the rotation of the zooming operation ring 26. When the switch ring 27 is rotated in either direction away from its neutral position N by means of the zooming operation ring 26, the direction of its rotation is first detected on the basis of the direction of a change in the position of the contact between the brush 37 and the code plate 38. The motor control circuit 40 (specifically, the rotating direction control circuit 40a of the circuit 40) drives the zoom driving motor 22 for rotation either in the forward direction or in the reverse direction, depending on the detected rotating direction detected of the zooming operation ring 26. To describe this in further detail, the zooming direction, which is regulated for either of telescopic zooming and wide angle zooming will be controlled on the basis of the direction in which the zooming operation ring 25 rotates.

In the meantime, the rotating angle of the switch ring 27, and consequently that of the zooming operation ring 26, will be detected on the basis of the amount of change in the position of contact between the brush 37 and the code plate 38 at the same time as the rotating direction is detected as mentioned above. The motor control circuit 40 (more specifically, the speed control circuit 40b of the circuit 40) is set in such a manner that it will increase the rotating speed of the zoom driving motor for zooming 22 as its rotating angle increases. Thus, the cam ring 15 is rotated when the zoom driving motor 22 is driven. As the result of this operation, the front group lens frame 11 holding the front group lens L1 and the rear group lens frame 14 holding the rear group lens L2 and the diaphragm moving ring 16 will move in their predetermined correlation in the optical axial direction, thereby performing a zooming operation.

Here, the zooming speed (namely, the revolving speed of the zoom driving motor 22) may be set continuously change in accordance with the rotating angle of the zooming operation ring 26 or to change in stages (or stops). The mode of changing the zooming speed can be set freely by a method of setting the code on the code plate 38 or by a signal processing method applied to the detected signals.

Figure 6:
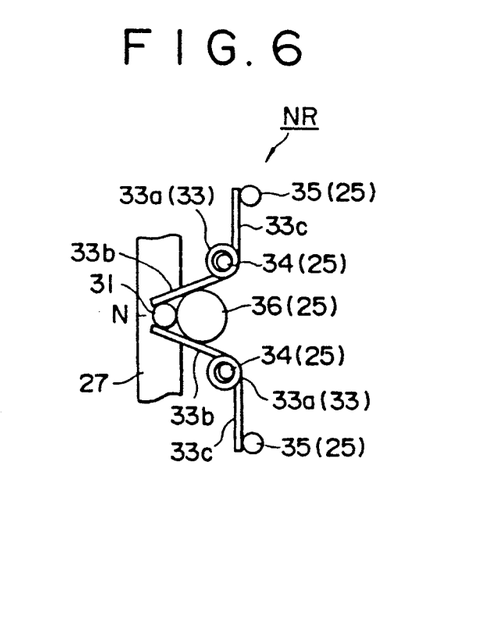
FIG. 6 is a development plan view illustrating in a development the construction of a neutral position return mechanism for a switch ring, with the return mechanism kept in its neutral position.
Figure 7:
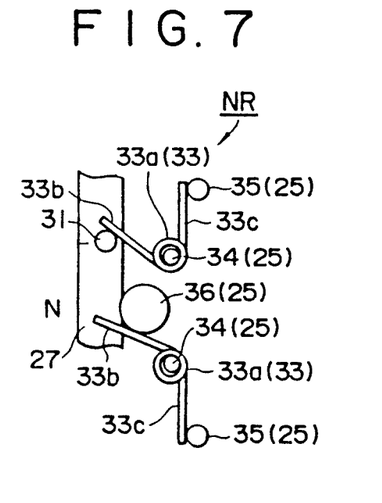
FIG. 7 is a development plan view illustrating in a development the construction of the neutral position return mechanism shown in FIG. 6, as kept in its zooming position.

Now that the return mechanism NR is constructed in the manner described above, the spring 33 positioned at the rotating side, out of a pair of neutral position return springs 33, will be pushed by the return column 31 to undergo elastic flexure, as shown in FIG. 7, when the zooming operation ring 26 is rotated in either the forward direction or the reverse direction from the neutral position N shown in FIG. 6. On the other hand, the spring 33 at the side opposite the rotation side will be kept in its state of direct contact with the neutral column 36. Also, when the operating force of the zooming operation ring 26 is released, the switch ring 27 will return to the neutral position N by way of the return column 31 with the force applied to it by the leg parts 33b of the neutral position return spring 33 at the flexing side (namely, at the rotating side), with the result that the driving motor for zooming 22 will be stopped. During a returning operation, the neutral column 36 can prevent the leg parts 33b from excessive deformation and can prevent the switch ring 27 from rotating beyond the neutral position N. The returning operations described above will be performed in the same way in either of the rotating directions of the zooming operation ring 26, namely, the forward direction (towards the telescopic side, for example) or the reverse direction (towards the wide angle direction, for example).

Then, the manual zoom (MZ) mode is attained by moving the zooming operation ring 26 in the opposite direction towards the MZ position along the optical axis. When the MZ mode is set, the engaging groove 26b and the projection 28b are in engagement with each other, and the zooming operation ring 26 and the manual zooming ring 28 will undergo a unified movement in their rotating direction. Thus, when the zooming operation ring 26, which is now placed in the MZ position, is rotated, the cam ring 15 will be driven to be rotated by the engagement of a straight line groove 28a formed on the manual operation ring 28 with the manual operation lever 23, and a zooming operation will thus be performed.

The lens barrel operating mechanism according to the present invention can be applied, for example, to the zooming operation ring 26 which forms a component of a lens barrel for an electrically operated zoom lens in the construction described above. The lens barrel operating mechanism in this example of preferred embodiment is characterized by being provided with a clicking mechanism which gives a clicking feel to the operator.

The clicking mechanism in this single example of preferred embodiment of the present invention is constructed in the manner illustrated in FIG. 8 through FIG. 13. Moreover, in the construction illustrated in these Figures, the arrangement of the zoom driving motor 22 is different from that shown in the description of the electrically operated zoom lens 10 set forth above with reference to FIG. 1 through FIG. 7. However, the different positions of the driving motor achieve the same functional effect.

Figure 8:
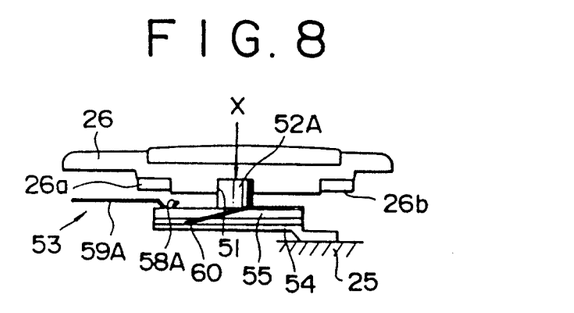
FIG. 8 is a sectional view illustrating the construction of a clicking mechanism in a lens barrel operating mechanism in an example of a preferred embodiment of the present invention.

As shown in FIG. 8, an annular groove 51 is formed along the entire circumference of the inner circumferential surface of the zooming operation ring. The annular groove 51 is fitted with three rollers 52A, 52B, and 52C, i.e., from a first through a third rollers, which are arranged at equal angular intervals of approximately 120 degrees, for example, in this example of preferred embodiment.

The first roller 52A is provided in the changeover switch part 53 for a switching operation between the operation of the electrical zooming mode and the manual zooming mode. The changeover switch part 53 is comprised of a stationary plate 54, which is fixed on the external stationary ring 25, and a sliding plate 55, which is provided in a manner permitting its sliding in the direction parallel with the direction of the optical axis towards the stationary plate 54. The first roller 52A is fixed on the surface at the outer side (the upper surface in FIG. 8) of the sliding plate 55.

Figure 9:
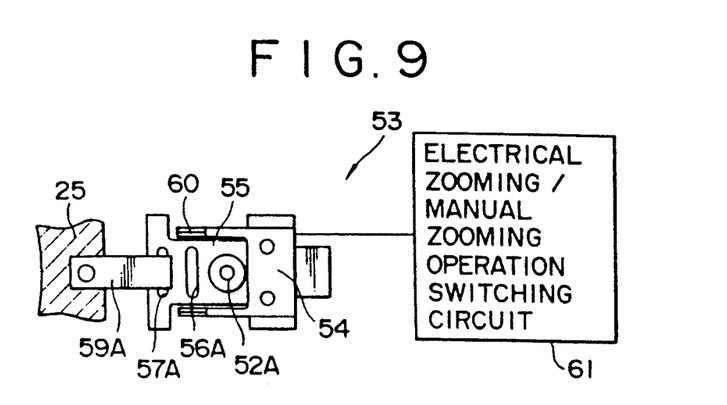
FIG. 9 is a structural drawing showing the construction of the clicking mechanism shown in FIG. 8, excluding the zooming operation ring, as viewed in the direction indicated by the arrow mark X in FIG. 8.

A pair of clicking grooves (or holes) 56A and 57A respectively corresponding to the PZ position and the MZ position of the zooming operation ring 26 are formed on the surface at the outer side of the sliding plate 55, as shown in FIG. 9. In the meantime, a clicking plate spring 59A having a projection 58A for selectively engaging in the clicking groove 56A or the clicking groove 57A is fixed at its base part on the external stationary ring 25.

Also, a brush 60, which comes into contact with the surface on the outer side of the stationary plate 54 is fixed on the surface at the inner side of the sliding plate 55. The position of contact of the brush 60 with the stationary plate 54 will be changed by the slide of the sliding plate 55 in the direction of the optical direction of the sliding plate 55.

Accordingly, the stationary plate 54 is connected with an electrical zooming/manual zooming switching circuit 61, so that the setting of the electrical zooming mode or the manual zooming mode can be detected by using the change in the electric potential of the stationary plate 54 in correspondence with the changes in the positions of contact between these two (i.e., plate 54 and brush 60). The electrical zooming/manual zooming switching circuit 61 determines, on the basis of the detected signals fed into the circuit, whether the zooming mode currently set is the electrical zooming mode or the manual zooming mode.

Figure 10:
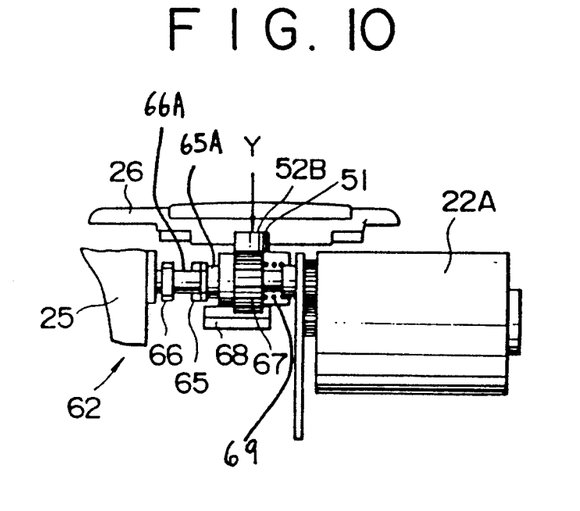
FIG. 10 is a sectional view which illustrates the construction of the clicking mechanism in a lens barrel operating mechanism in an example of a preferred embodiment of the present invention, showing the clicking mechanism in a sectional position different from the section shown in FIG. 8.

Moreover, the second roller 52B is installed, as shown in FIG. 10, in a clutch mechanism part 62 for connecting and disconnecting the transmission of the driving power generated by the zoom driving motor 22. In further detail, the external stationary ring 25 has a pair of guide rails 63 fixed thereon and extending in the optical axial direction, and a slide changing plate 64 is installed on the pair of guide rails 63 in such a manner that the slide changing plate 64 can move along these guide rails 63. The second roller 52B is fixed on the slide changing plate 64.

Figure 11:
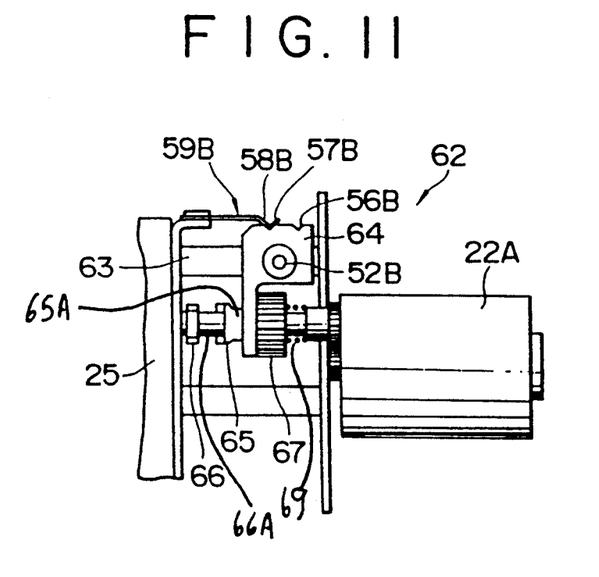
FIG. 11 is a structural view showing the construction shown in FIG. 10, excluding the zooming operation ring, as viewed in the direction indicated by the arrow mark Y in FIG. 10.

The slide changing plate 64 is provided with a pair of clicking grooves 56B and 57B respectively corresponding to the PZ position and the MZ position of the zooming operation ring 26, as shown in FIG. 11 in the same manner as in the case of the changeover switch part 53. On the other hand, a clicking plate spring 59B, which has a clicking projection 58B at its distal end for selectively engaging with the clicking groove 56B and 57B is fixed by its base part on the external stationary ring 25.

Moreover, the slide changing plate 64 is constructed in such a way that it cancels the engagement and combination of a pair of clutch gears 65 and 66, which form the clutch mechanism part 62, whenever the zooming operation ring 26 is in the MZ position, and that it brings the two clutch gears 65 and 66 into engagement with each other whenever the zooming operation ring 26 is in the PZ position.

The clutch gear 66 is coaxially fixed to a shaft 66A which is rotated by the motor 22A. On the other hand, the clutch gear 65 is coaxially fixed to a hollow shaft 65A into which the shaft 66A is inserted so as to be rotatable about the axial direction of the shaft 66A and movable in the axial direction of the shaft 66A. In other words, the hollow shaft 65A is movable relative to the shaft 66A in the axial direction. Further, the output gear 67 is coaxially fixed to the outer periphery of the hollow shaft 65A. The hollow shaft 65A is moved in accordance with the movement of the slide changing plate 64.

When the slide changing plate 64 is moved to the MZ position, the clicking projection 58B of the clicking plate spring 59B comes to be engaged with the clicking groove 57B for MZ and the hollow shaft 65A is moved to the motor side against the urging force of the spring 69, and thereby disengaging the clutch gear 65 from the clutch gear 66, as shown in FIG. 11. As a result, the revolutions of the zoom driving motor 22A will not be transmitted to the output gear 67.

On the other hand, when the slide changing plate 64 is moved to the PZ position, the clicking projection 58B comes to be engaged with the clicking groove 56B for PZ and the hollow shaft 65A is moved to leftward in FIG. 11, and thereby engaging the clutch gear 65 with the clutch gear 66. As a result, the revolutions of the zoom driving motor 22A will be transmitted to the output gear 67 and accordingly the cam ring 15 is rotated.

Thus, when the two clutch gears are mutual engagement in this manner, the revolutions of the zoom driving motor will be transmitted to the output gear 67, and the output gear 67, being in engagement with a gear 68, transmits the revolutions of the driving motor for zooming 22 to the cam ring 15 via the gear 68.

Figure 12:
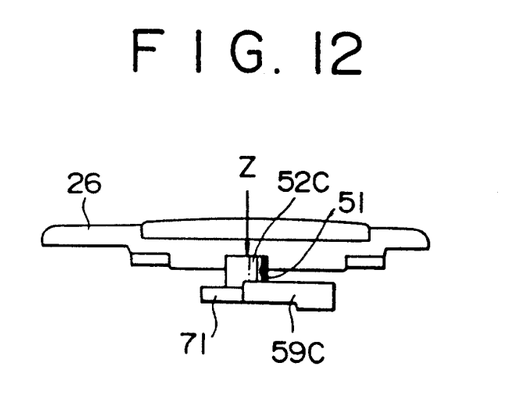
FIG. 12 is a sectional view illustrating a clicking mechanism in a lens barrel operating mechanism in an example of a preferred embodiment of the present invention, showing the clicking mechanism in a sectional position different from those shown in FIG. 8 and in FIG. 10.
Figure 13:
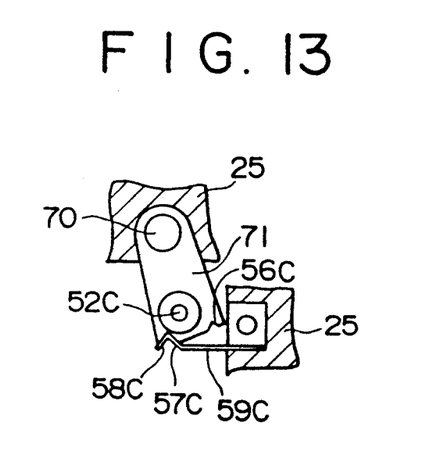
FIG. 13 is a structural view illustrating the construction shown in FIG. 12, excluding the zooming operation ring, as viewed in the direction indicated by the arrow mark Z in FIG. 12.

On the other hand, the third roller 52C is fixed on a swinging (sliding) lever 71 which, as shown in FIG. 12, is installed on the external stationary ring 25 by way of a supporting shaft 70 in such a manner as to permit its free swinging motion. A pair of clicking grooves 56C and 57C respectively corresponding to the PZ position and the MZ position on the zooming operation ring 26 are formed on the distal end surface of the swinging lever 71, as shown in FIG. 13, in the same manner as in the case of the changeover switch part 53 and the clutch mechanism part 62. In the meantime, a clicking plate spring 59C having a clicking projection 58C to be engaged selectively with the clicking grooves 56C and 57C is fixed by its base part on the external stationary ring 25.

Here, it is made possible to keep the overall clicking mechanism in proper balance with the swinging lever 71, the changeover switch part 53, and the clutch mechanism part 62 set in an equal spacing arrangement in the circumferential direction.

Therefore, with the clicking mechanism as an lens barrel operating mechanism in the construction described in detail in this example of the preferred embodiment, the clicking projections 58A, 58B, and 58C of the clicking plate springs 59A, 59B, and 59C will fit respectively into the clicking grooves 57A, 57B, and 57C when the zooming operation ring 26 is moved to the MZ position (which is the position illustrated in the Figure) in a rear area, but the same clicking projections 58A, 58B, and 58C will fit into the clicking grooves 56A, 56B, and 56C when the zooming operation ring 26 is moved to the PZ position in the forward area, and the clicking mechanism according to the present invention can offer a distinct clicking feel with certainty.

Now, the clicking mechanism is constructed in such a manner that the zooming operation ring 26 is not liable to any external force acting radially outwardly. For this reason, the clicking operation will not place any load on the straight movement of the zooming operation ring 26, so that the clicking mechanism can directly produce a desirable operating sensation (of the click ring).

Moreover, according to the single example of preferred embodiment given above, the clicking mechanism is installed in correlation with the changeover switch part 53 and the clutch mechanism part 62, so that the overall construction thus formed will enable a reduction of space and a reduction of the number of component parts and will eventually be able to attain a reduction of the operating mechanism in size, weight, and cost.

Now, it should be noted that the present invention is not limited to the example of its preferred embodiment described above, but may be applied effectively to various other modified forms of its embodiment to such an extent as will not deviate from the essential technical scope defined above for the present invention.

For instance, the clicking mechanism as an operating mechanism according to the present invention has been described for its application to a lens barrel for an electrically operated zoom lens in the single example of preferred embodiment, but it goes without saying that the present invention can be applied to any construction in any case in which it is desired to enable the operator to gain a clear and definite recognition of the operating position in which the operating member is set, provided that the operating members for the lens barrel can move between at least two operating positions. For example, the present invention can be applied effectively to an automatic focusing (AF) and manual focusing (MF) switching ring, which performs switching between automatic focusing (AF) and manual focusing (MF) in the same manner, in addition to its application to a zooming operation ring which performs switching operations between the electrical zooming mode and the manual zooming mode.

Furthermore, it has been described in the example of the preferred embodiment given above that the swinging lever 71, the changeover switch part 53, and the clutch mechanism part 62 are to be arranged equally spaced in the circumferential direction, but the present invention is not to be limited to such a construction, but may be applied effectively, for example, to another construction in which a clicking mechanism consisting solely of the swinging lever 71 can be arranged in a plural number, for example, three pieces, in the circumferential direction.

The present application relates to subject matters contained in Japanese Patent Application No. HEI 3-218141 filed on May 21, 1991, which is expressly incorporated herein by reference in its entirety.

What is claimed is:

1. A lens barrel operating mechanism provided with a stationary ring arranged coaxially about an optical axis, said mechanism comprising;
    an operating ring arranged on an outer circumference of said stationary ring such that said operating ring is linearly movable in an optical axis direction of said stationary ring and rotatable about said optical axis, said operating ring being provided with an annular groove formed on its inner circumferential surface;
    a sliding member including at least one roller fitted into said annular groove to be relatively movable in an extending direction of said annular groove, said sliding member being movable in an interlocking manner with the movement of said operating ring along said optical axis in the same direction as the direction in which said operating ring moves; and
    clicking means arranged between said sliding member and said stationary ring for providing a clicking sensation to an operator at both terminal positions of a movement range of said operating ring in said optical axis direction.

2. The lens barrel operating mechanism according to claim 1, wherein said clicking means includes:
    a pair of clicking grooves formed on said sliding member and respectively corresponding to the two terminal positions of said movement range; and
    a plate spring fixed on said stationary ring and having engaging parts for selectively engaging with either one of said pair of clicking grooves in accordance with the movement of said operating ring in said optical axis direction.

3. The lens barrel operating mechanism according to claim 1, wherein said operating ring is a zooming operating ring for setting a zooming mode by performing a switching operation between an electrical zooming mode and a manual zooming mode in the two terminal positions in said optical axis direction.

4. The lens barrel operating mechanism according to claim 3, which further comprises electrical switching means for electrically switching between said electrical zooming mode and said manual zooming mode, wherein
    said clicking means is provided on said electrical switching means.

5. The lens barrel operating mechanism according to claim 4, wherein said electrical switching means comprises:
    an electrical brush installed on said sliding member;
    a substrate plate mounted on said stationary ring and arranged to be in contact with said electrical brush; and
    control means for defining selection between said electrical zooming mode and said manual zooming mode in accordance with the position of the contact made by said electrical brush with said substrate plate.

6. The lens barrel operating mechanism according to claim 4, wherein said clicking means includes:
    a pair of clicking grooves formed on said sliding member and respectively corresponding to the two terminal positions; and
    a plate spring fixed on said stationary ring and having engaging parts for selectively engaging with either one of said pair of clicking grooves in accordance with the movement of said operating ring in said optical axis direction.

7. The lens barrel operating mechanism according to claim 3, further comprising:
    an electrically operated zooming motor;
    a cam ring for changing a focal length of a lens; and
    clutch means for connecting and disconnecting the transmission of driving power generated by said electrically operated zooming motor to said cam ring, wherein
    said clicking means is provided on said clutch means.

8. The lens barrel operating mechanism according to claim 7, wherein said clutch means comprises means for permitting the transmission of the driving power generated by said electrically operated zooming motor to said cam ring when the electrical zooming mode is set by an operation of said operating ring, and cuts off the transmission of the driving power generated by said electrically operated zooming motor to said cam ring when the manual zooming mode is set.

9. The lens barrel operating mechanism according to claim 7, wherein said clicking means includes:
    a pair of clicking grooves formed on said sliding member and respectively corresponding to the two terminal positions; and
    a plate spring fixed on said stationary ring and having engaging parts for selectively engaging with either one of said pair of clicking grooves in accordance with the movement of said operating ring in said optical axis direction.

10. The lens barrel operating mechanism according to claim 1, wherein said sliding member includes a swinging lever which is swingably mounted on said stationary ring and provided with at least one roller, said clicking means comprising a pair of clicking grooves formed on end surfaces of said swinging lever, in correspondence with the terminal positions and a spring plate fixed on said stationary ring and having an engaging part for selectively engaging with either one of said pair of clicking grooves in accordance with the movement of said operating ring in said optical axis direction.

* * * * *